(12) United States Patent
McCoy

(10) Patent No.: US 12,305,376 B2
(45) Date of Patent: May 20, 2025

(54) AIR ADMITTANCE VALVE

(71) Applicant: Xmark SP LLC, Nampa, ID (US)

(72) Inventor: Daniel L. McCoy, Nampa, ID (US)

(73) Assignee: Xmark SP LLC, Nampa, ID (US)

( * ) Notice: Subject to any disclaimer, the term of this patent is extended or adjusted under 35 U.S.C. 154(b) by 0 days.

(21) Appl. No.: 18/301,396

(22) Filed: Apr. 17, 2023

(65) Prior Publication Data
US 2024/0392546 A1 Nov. 28, 2024

(51) Int. Cl.
*E03C 1/122* (2006.01)
*F16K 24/06* (2006.01)

(52) U.S. Cl.
CPC ............ *E03C 1/1225* (2013.01); *F16K 24/06* (2013.01)

(58) Field of Classification Search
CPC .......... F16K 24/06; F16K 15/06; F16K 17/02; E03C 1/1225
See application file for complete search history.

(56) References Cited

U.S. PATENT DOCUMENTS

| | | | |
|---|---|---|---|
| 59,364 A | 11/1866 | Conant et al. | |
| 418,146 A | 12/1889 | Goglio | |
| 485,984 A | 11/1892 | Randall | |
| 953,330 A | 3/1910 | Gordan, Jr. | |
| 1,485,508 A | 3/1924 | Kiley | |
| 1,608,379 A | 11/1926 | Ewald | |
| 1,739,430 A * | 12/1929 | Webster | F16K 24/06 137/533.21 |
| 1,793,825 A | 2/1931 | Pope | |
| 2,074,329 A | 3/1937 | Gieseman | |
| 2,621,017 A | 12/1952 | Yohpe | |
| 2,732,856 A | 1/1956 | Jurs et al. | |
| 2,807,277 A | 9/1957 | Bailey | |
| 3,145,724 A | 8/1964 | Pelzer | |
| 3,394,732 A | 7/1968 | Lisciani | |
| 3,479,470 A | 11/1969 | Ham, Jr. | |

(Continued)

FOREIGN PATENT DOCUMENTS

| | | |
|---|---|---|
| DE | 969650 | 6/1958 |
| DE | 3036448 A1 | 4/1981 |

(Continued)

OTHER PUBLICATIONS

Machine English Translation of DE202009016069U1 (Year: 2021).*

(Continued)

*Primary Examiner* — Hailey K. Do
(74) *Attorney, Agent, or Firm* — Parsons Behle & Latimer

(57) ABSTRACT

An air admittance valve that includes a base, a flow control member, a diaphragm, and a cap. The base is open at its ends and includes an interior, an exterior, and a sidewall with at least a first port in the sidewall. The flow control member extends transverse across the interior of the base and includes a cavity aligned and in communication with the first port. The flow control member includes a central opening in the top side that is in communication with the cavity. The cap is selectively connected to the base and includes one or more openings in a sidewall that permit fluid to flow into the cavity. The diaphragm prevents a flow of fluid from the interior of the base into the cavity and permits a flow of fluid from the cavity of the flow control member into the interior of the base.

18 Claims, 4 Drawing Sheets

(56) References Cited

U.S. PATENT DOCUMENTS

| | | | |
|---|---|---|---|
| 3,542,059 | A | 11/1970 | Blanchard |
| 3,923,081 | A | 12/1975 | Persson |
| 4,181,146 | A | 1/1980 | Goglio |
| 4,266,568 | A | 5/1981 | Kuykendall |
| 4,379,470 | A | 4/1983 | Reutter |
| 4,414,997 | A | 11/1983 | Jacobson |
| 4,502,502 | A | 3/1985 | Krug |
| 4,513,784 | A | 4/1985 | Farrand |
| 4,518,014 | A | 5/1985 | McAlpine |
| 4,556,084 | A | 12/1985 | Frawley |
| 4,665,943 | A | 5/1987 | Medvick |
| 4,683,910 | A | 8/1987 | Benson |
| 4,962,548 | A | 10/1990 | vanDeventer |
| 4,991,623 | A | 2/1991 | Erickson |
| 5,048,560 | A | 9/1991 | Jannotta et al. |
| 5,067,449 | A | 11/1991 | Bonde |
| 5,129,426 | A | 7/1992 | Boehmer |
| 5,273,068 | A | 12/1993 | Duren |
| 5,419,366 | A | 5/1995 | Johnston |
| 5,520,522 | A | 5/1996 | Rathore |
| 5,803,112 | A | 9/1998 | Andersson |
| 5,819,793 | A | 10/1998 | Rajewski |
| 5,836,345 | A | 11/1998 | Ericson |
| 5,897,305 | A | 4/1999 | Roddis |
| 5,996,563 | A | 12/1999 | Liao |
| 6,308,731 | B1 | 10/2001 | Kawasaki |
| 6,415,816 | B1 | 7/2002 | Beckey et al. |
| 6,532,988 | B1 | 3/2003 | Ericson |
| 6,666,663 | B2 | 12/2003 | Lee et al. |
| 7,395,835 | B1 | 7/2008 | Gohlke |
| 7,445,022 | B2 | 11/2008 | McCoy |
| 7,871,605 | B2 | 7/2011 | McCoy |
| 2006/0011239 | A1 | 1/2006 | Stone |

FOREIGN PATENT DOCUMENTS

| | | | | |
|---|---|---|---|---|
| DE | 202009016069 U1 | * | 5/2011 | ............ E03C 1/122 |
| EP | 0109956 A1 | * | 11/1983 | ............ E03C 1/122 |
| EP | 1650363 A2 | * | 4/2006 | ............ E03C 1/122 |
| EP | 2224066 A1 | * | 9/2010 | ............ E03C 1/122 |
| GB | 901978 | | 7/1962 | |
| GB | 1302631 | | 1/1973 | |
| GB | 2059289 | | 4/1981 | |
| GB | 2088023 | | 6/1982 | |
| GB | 2124344 | | 2/1984 | |
| GB | 2231391 A | * | 11/1990 | ............ E03C 1/122 |
| GB | 2232461 A | * | 12/1990 | ............ E03C 1/122 |
| WO | WO-2013100805 A1 | * | 7/2013 | ............ F16K 15/06 |

OTHER PUBLICATIONS

Machine English translation of EP0109956A1 (Year: 2024).*
Machine English translation of WO2013100805A1 (Year: 2024).*
Notice of Allowance dated Jun. 27, 2008 from related U.S. Appl. No. 11/039,502.
Final Office Action dated Jun. 8, 2009 from related U.S. Appl. No. 11/413,806.
US Office Action dated Dec. 16, 2008 from related U.S. Appl. No. 11/413,806.
US Office Action dated Dec. 17, 2009 from related U.S. Appl. No. 11/413,806.
US Office Action dated Jun. 28, 2010 from related U.S. Appl. No. 11/413,806.
US Office Action dated Dec. 9, 2010 from related U.S. Appl. No. 11/413,806.
US Office Action dated Mar. 2, 2011 from related U.S. Appl. No. 11/413,806.

* cited by examiner

AIR ADMITTANCE VALVE

FIELD OF THE DISCLOSURE

The embodiments described herein relate to air admittance valves for the equalization of pressure within a plumbing system.

BACKGROUND

Description of the Related Art

Plumbing systems require a mechanism to equalize pressure between the system and the ambient atmosphere when the pressure in the plumbing system is less than the atmospheric pressure. The equalization of pressure may be necessary to maintain liquid trap seals employed in plumbing systems. One way to achieve pressure equalization of a plumbing system is to include external ventilation stacks to vent the plumbing system to the exterior of a building. External ventilation stacks allow the pressure within a plumbing system to constantly equalize to atmospheric pressure while venting fluid (i.e., gas, air, and/or liquid) external of the building. External ventilation stacks require building a path from one or more points in a plumbing system to a stack located on the exterior of a building, which adds to the expense of building a plumbing system in a building.

Another mechanism used to equalize the pressure within a plumbing system is an air admittance vent or air admittance valve. Air admittance valves allow fluid (e.g., air) exterior from the valve to enter the plumbing system while preventing fluid (which may include air, gases, and liquid) from the plumbing system to flow out of the air admittance valve. This is important as air admittance valves are located within a building and it may be less than desirable to permit fluid from the plumbing system being vented to the interior of a building. An air admittance valve may be placed most anywhere along a plumbing system within a building to prevent negative pressure (i.e., less than atmospheric pressure) to build up within the plumbing system.

Typically, an air admittance valve needs to be responsive to small drops in pressure such as less than 0.01 pounds per square in (PSI) below atmospheric pressure. Due to the high sensitivity of present air admittance valves, such valves may be damaged during pressure testing of a plumbing system. For example, the diaphragm of an air admittance valve may be damaged and do to the damage may no longer prevent fluid from the plumbing system to vent to the interior of a building. Present air admittance valves typically include a cap that is either sonic welded or glued to the base, which requires both components to be constructed with the same material, which may increase the cost in manufacturing the air admittance valves. Further, such constructing may require the entire replacement of the valve in the event a single component, such as the diaphragm is damaged. Other disadvantages exist.

SUMMARY

The present disclosure is directed to an air admittance valve for the equalization of pressure within a plumbing system.

An embodiment of the disclosure is an apparatus comprising a base. The base has a first end, a second end, an interior, and an exterior. The base includes a sidewall. The base is open at the first end and is open at the second end. The base includes at least a first port in the sidewall. The apparatus includes a flow control member. The flow control member extends transverse across the interior of the base. The flow control member has a top side, a bottom side, and a cavity between the top side and the bottom side. The cavity is aligned and in communication with the first port. The flow control member includes a central opening in the top side. The central opening is in communication with the cavity and the cavity only communicates with the interior of the base through the central opening in the top side of the flow control member.

The apparatus includes a cap. The cap is selectively connected to the first end of the base and the cap includes one or more openings in a sidewall. The one or more openings in the sidewall of the cap permit fluid to flow from the exterior of the cap into the cavity of the flow control member. The apparatus includes a diaphragm. The diaphragm is positioned between the top side of the flow control member and the cap. The diaphragm selectively seals the central opening in the top side of the flow control member. The diaphragm prevents a flow of fluid from the interior of the base into the cavity of the flow control member and permits a flow of fluid from the cavity of the flow control member into the interior of the base.

The apparatus may include a second port in the sidewall. The second port may be opposite the first port. The sidewall of the base may be cylindrical. The apparatus may include a first standoff that extends from the top side of the flow control member and a second standoff that extends from the top side of the flow control member. The apparatus may include a first guide that extends from a top surface of the first standoff, a second guide that extends from the top surface of the first standoff, a third guide that extends from a top surface of the second standoff, and a fourth guide that extends from the top surface of the second standoff.

The apparatus may include a ring that extends from the top side of the flow control member. The ring may surround the central opening in the top side of the flow control member and the diaphragm may selectively create a seal on the ring. The diaphragm may include a circular disc having a top surface, a bottom surface, and a perimeter. The diaphragm may include a sealing member positioned adjacent to the bottom surface of the circular disc. The sealing member may extend beyond the perimeter of the circular disc. The diaphragm may include a retaining member. The retaining member may connect a portion of the sealing member to the bottom surface of the circular disc. The diaphragm may include a first arm that extends from the top surface of the circular disc. The first arm may extend beyond the perimeter of the circular disc. The diaphragm may include a second arm that extends from the top surface of the circular disc. The second arm may be positioned opposite of the first arm and may extend beyond the perimeter of the circular disc.

An end of the first arm may be positioned adjacent to the top surface of the first standoff and may be positioned between the first guide and the second guide. An end of the second arm may be positioned adjacent to the top surface of the second standoff and may be positioned between the third guide and the fourth guide. The apparatus may include a stem that extends away from the retaining member of the diaphragm. The apparatus may include a receptacle positioned within the cavity between the top side and the bottom side of the flow control member. The stem may be positioned within the receptacle. The apparatus may include a receptacle that extends away from the retaining member of the diaphragm. The apparatus may include a stem positioned within the cavity between the top side and the bottom side of the flow control member with the stem positioned within the receptacle.

The apparatus may include a recess in the top surface of the circular disc. The apparatus may include a projection that extends from an interior of the cap towards the diaphragm. An end of the projection may be positioned in the recess in the top surface of the circular disc. The apparatus may include a projection that extends from the top surface of the circular disc. The apparatus may include a recess in the interior of the cap with an end of the projection positioned in the recess in the interior of the cap.

The apparatus may include a first o-ring positioned on the exterior of the base. The first o-ring may be positioned between the first end of the base and the first port. The first o-ring may create a seal between the base and the cap. The apparatus may include a first groove in the exterior of the base. The first groove may be positioned between the first end of the base and the first o-ring. The apparatus may include a second groove in the interior of the cap. The second groove may be configured to receive the first o-ring positioned on the exterior of the base. The apparatus may include a ridge on the interior of the cap. The first groove in the exterior of the base may be configured to receive the ridge on the interior of the cap. The apparatus may include threads on the exterior of the base. The threads may be located adjacent to the second end of the base. The apparatus may include a second o-ring on the exterior of the base. The second o-ring may be positioned between the threads and the first port.

Additional embodiments exits.

Figure 1:
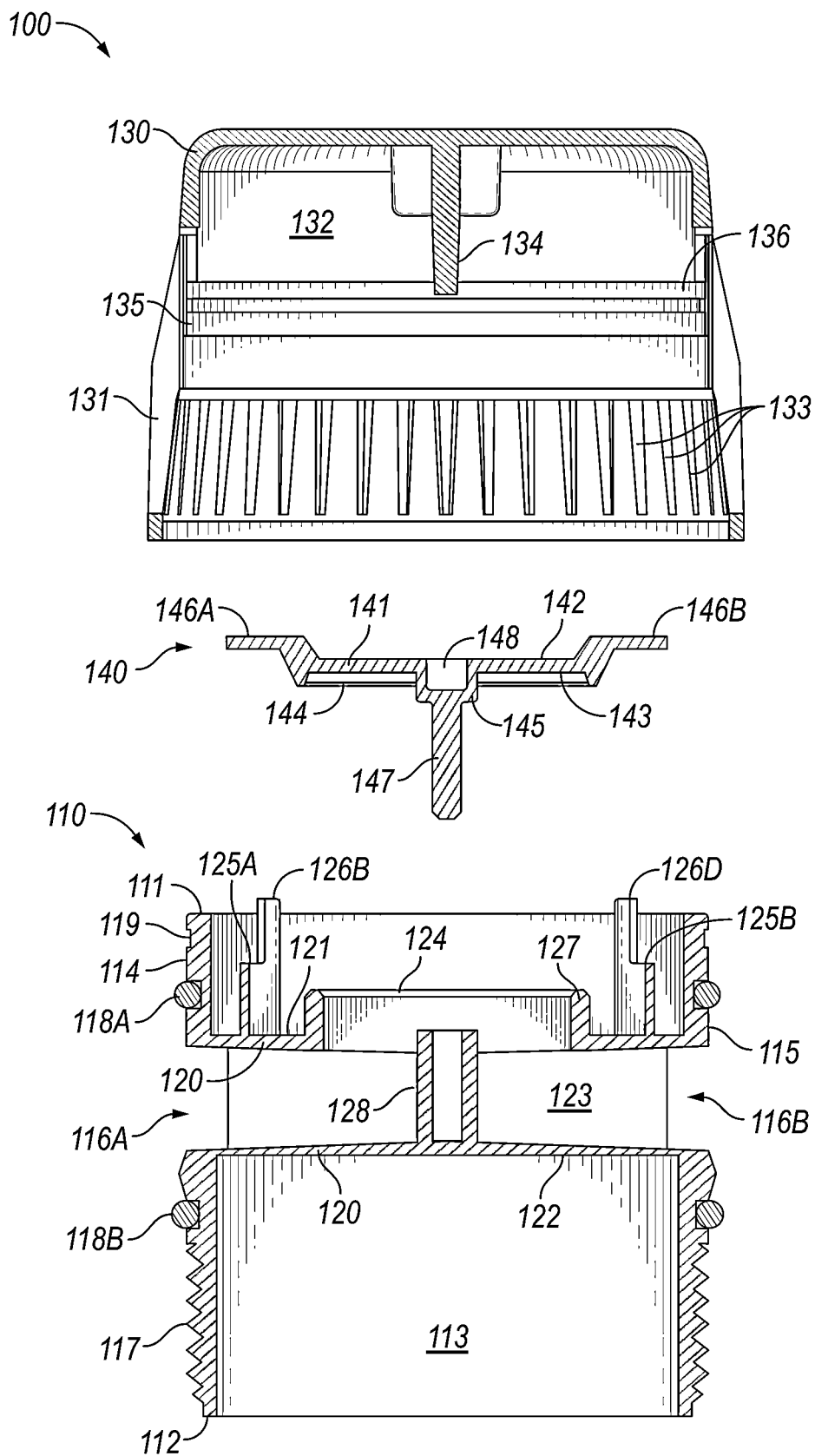
FIG. 1 is an exploded cross-sectional view of an embodiment of an air admittance valve.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

Figure 2:
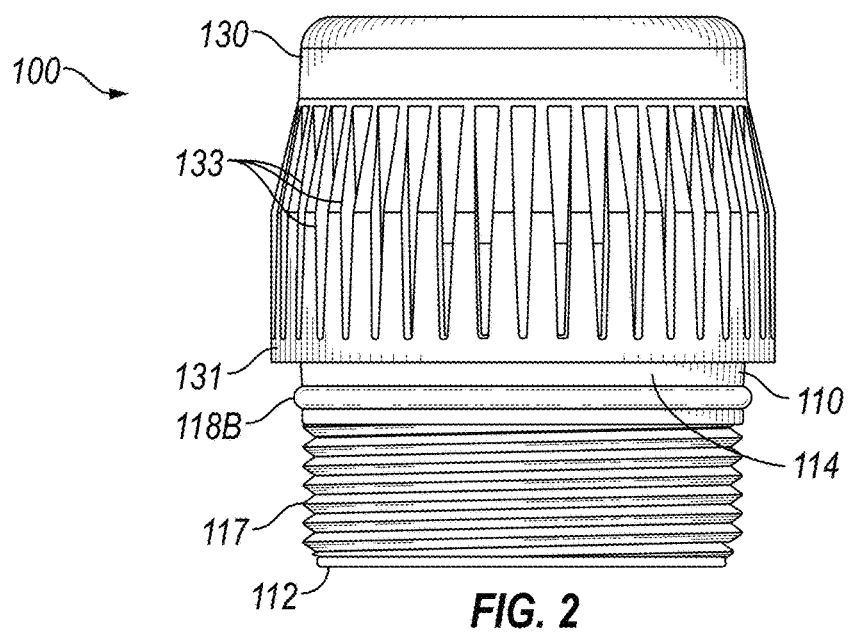
FIG. 2 is a side view of an embodiment of an air admittance valve.
Figure 3:
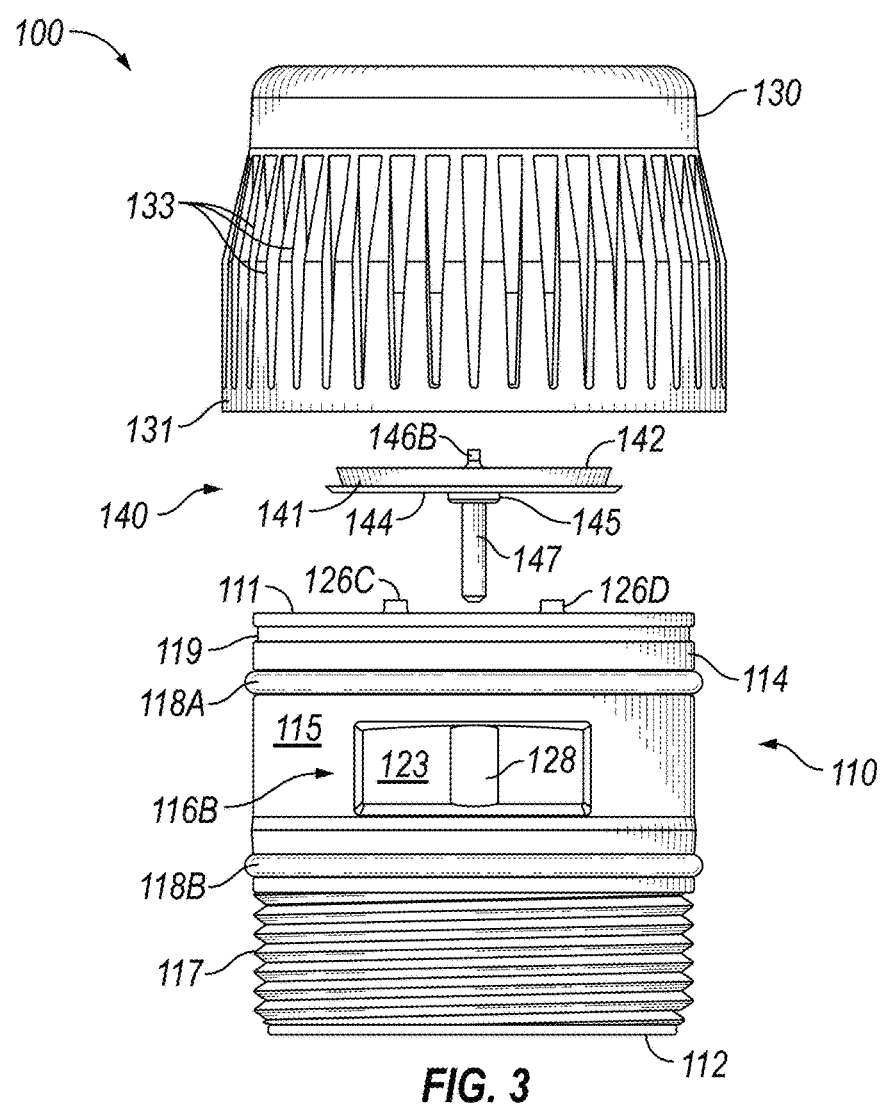
FIG. 3 is an exploded side view of an embodiment of an air admittance valve.

FIG. 1 shows an exploded cross-sectional view of an air admittance valve (also referred to herein as an apparatus) 100. FIG. 2 shows a side view of the air admittance valve 100 and FIG. 3 shows an exploded side view of the air admittance valve 100. The air admittance valve 100 includes a base 110. The base 110 has a first end 111, a second end 112, an interior 113, and an exterior 114. The base 110 includes a sidewall 115. The sidewall 115 of the base 110 may be cylindrical, but may have a different shape as would be appreciated by one of ordinary skill in the art having the benefit of this disclosure. The base 110 is open at the first end 111 and is open at the second end 112. The base 110 includes at least a first port 116A in the sidewall 115. The base 110 may include a second port 116B in the sidewall 115.

The air admittance valve 100 includes a flow control member 120 positioned within the interior 113 of the base 110. The flow control member 120 extends transverse across the interior 113 of the base 110 and forms an annulus 113A on either side of the flow control member 120 (best shown in FIGS. 4 and 5). The flow control member 120 has a top side 121, a bottom side 122, and a cavity 123 between the top side 121 and the bottom side 122. The cavity 123 is aligned and in communication with at least the first port 116A. The cavity 123 may be aligned with both the first port 116A and the second port 116B. The flow control member 120 includes a central opening 124 in the top side 121. The central opening 124 is in communication with the cavity 123 and the cavity 123 only communicates with the interior 113 of the base 110 through the central opening 124 in the top side 121 of the flow control member 120.

Figure 4:
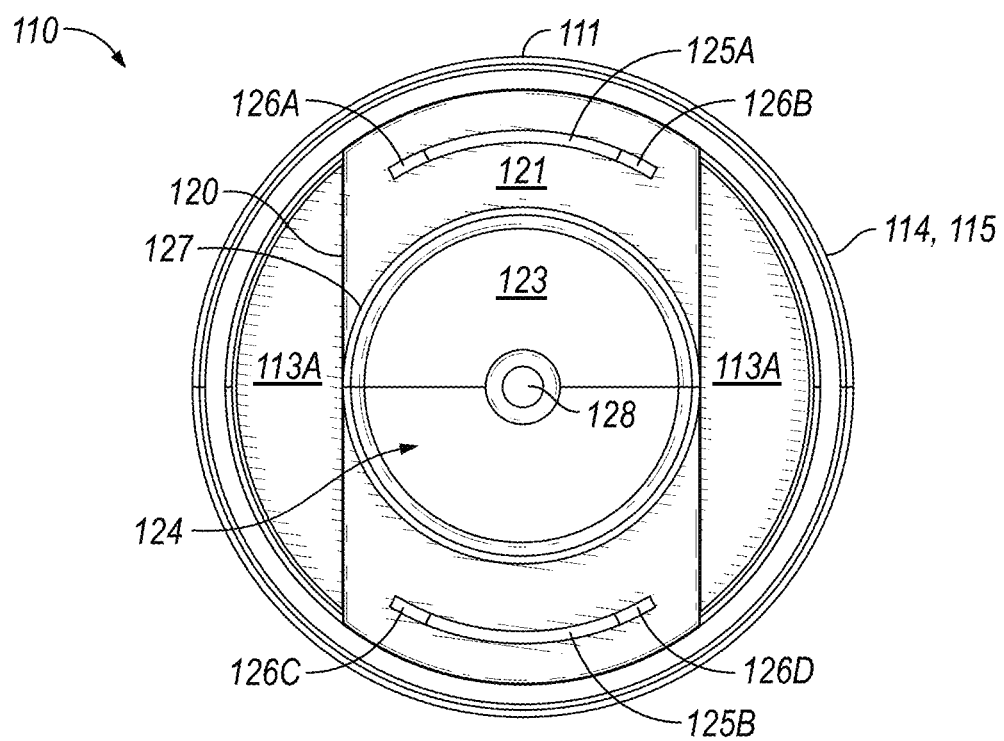
FIG. 4 is a top view of a portion of an embodiment of an air admittance valve.
Figure 5:
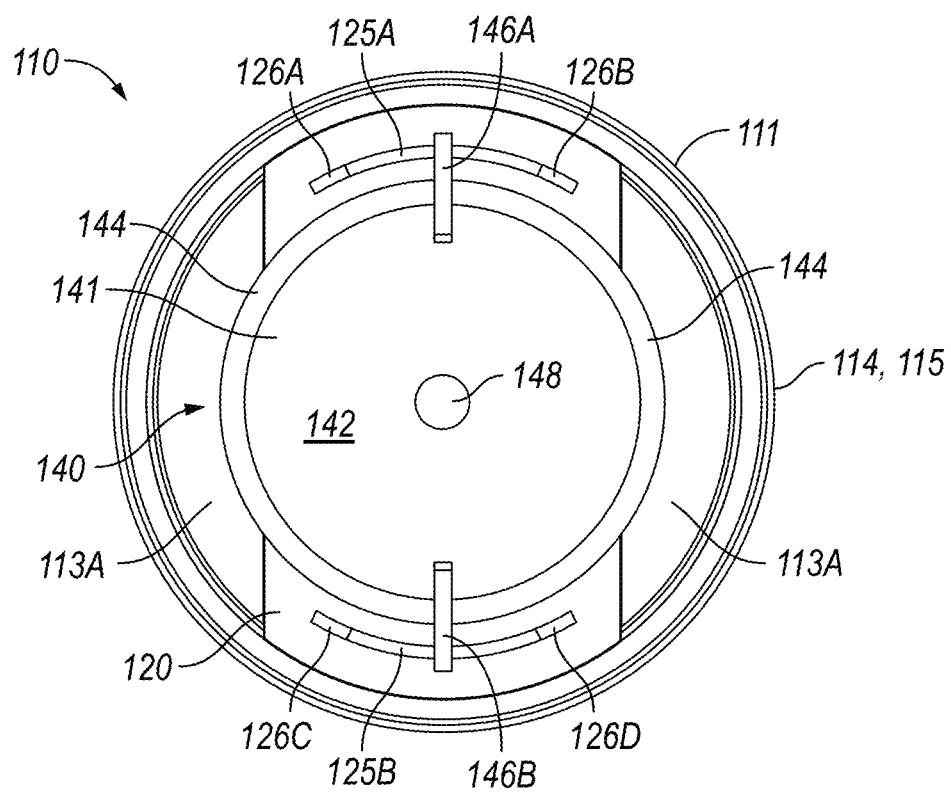
FIG. 5 is a top view of a portion of an embodiment of an air admittance valve.

The base 110 includes a first standoff 125A that extends from the top side 121 of the flow control member 120 and a second standoff 125B that extends from the top side 121 of the flow control member 120. The air admittance valve 100 includes a first guide 126A that extends from a top surface of the first standoff 125A and a second guide 126B that extends from the top surface of the first standoff 125A. The base 110 includes a third guide 126C that extends from a top surface of the second standoff 125B, and a fourth guide 126D that extends from the top surface of the second standoff 125B. The first and second standoffs 125A/125B may limit the travel of a diaphragm 140 as discussed herein. Likewise, the first, second, third, and fourth guides 126A-126D may prevent rotation of a diaphragm 140 as discussed herein. FIG. 4 is a top view of the base 110 with the diaphragm 140 removed for clarity and FIG. 5 is a top view of the base 110 with the diaphragm 140 inserted into the interior 113 of the base 110. The first and second standoffs 125A/125B and the first, second, third, and fourth guides 126A-126D as best shown in FIGS. 4 and 5.

The air admittance valve 100 includes a first o-ring 118A positioned on the exterior 114 of the base 110. The first o-ring 118A is positioned between the first end 111 of the base 110 and the first and second ports 116A/116B. The first o-ring 118 creates a seal between the base 110 and the cap 130. The air admittance valve 100 includes a first groove 119 in the exterior 114 of the base 110. The first groove 119 is positioned between the first end 111 of the base 110 and the first o-ring 118A. The apparatus 100 includes a second groove 135 in the interior 132 of the cap 130. The second groove 135 is configured to receive the first o-ring 118A positioned on the exterior 114 of the base 110. The apparatus 100 includes a ridge, or snap ring, 136 on the interior 132 of the cap 130. The first groove 119 in the exterior 114 of the base 110 is configured to receive the ridge 136 on the interior 132 of the cap 130. The base 110 include threads 117 on the exterior 114 of the base 110. The threads 117 are located adjacent to the second end 112 of the base 110 and enable the air admittance valve 100 to be connected to a plumbing system. The air admittance valve includes a second o-ring 118B on the exterior 114 of the base 110. The second o-ring 118B is positioned between the threads 117 and the first and second port 116A/116B. The second o-ring 118B creates a seal when connected to a pipe of the plumbing system.

The apparatus 100 includes a cap 130. The cap 130 is selectively connected to the first end 111 of the base 110. For example, the interior 132 of the cap 130 includes a ridge, or snap ring, 136 that is configured to mate with a groove, or profile, 119 in the exterior 114 of the base 110. The ridge 136 snaps into the groove 119 on the exterior 114 of the base 110 to selectively secure the cap 130 to the base 110. Alternatively, the interior 132 of the cap 130 may include a groove, or profile, and the exterior 114 of the base 110 may include a snap ring as would be appreciated by one of ordinary skill in the art having the benefit of this disclosure.

The selective attachment of the cap 130 to the base 110 instead of sonic welding or being glued together enables the cap 130 to be made from a different material than the base 110. This may decrease the manufacturing cost of the apparatus 100. For example, the base 110 may be comprised of, but is not limited to, polyvinyl chloride (PVC) and the cap may be comprised of, but is not limited to, acrylonitrile butadiene styrene (ABS). The removability of the cap 130 from the base 110 also enables the replacement of internal components, if needed.

The cap 130 includes one or more openings 133 in the exterior 131 of the cap 130. The one or more openings 133 in the exterior 131 of the cap 130 permit fluid to flow from the exterior of the cap 130 into the cavity 123 of the flow control member 120 when the cap 130 is connected to the base 110.

The air admittance valve 100 includes a diaphragm 140 that enables the equalization of pressure within a plumbing system. The diaphragm 140 enables the flow of fluid from the atmosphere to enter into the plumbing system when the pressure within the plumbing system is below the atmospheric pressure as discussed herein. The diaphragm 140 also prevents the flow of fluid from the plumbing system to vent to the exterior of the air admittance valve 100 as discussed herein. The diaphragm 140 is positioned between the top side 121 of the flow control member 120 and the cap 130. The diaphragm 140 selectively seals the central opening 124 in the top side 121 of the flow control member 120. As discussed herein, the diaphragm 140 prevents a flow of fluid from the interior 113 of the base 110 into the cavity 123 of the flow control member 120 and permits a flow of fluid from the cavity 123 of the flow control member 120 into the interior 113 of the base 110.

The flow control member 120 includes a ring 127 that extends from the top side 121 of the flow control member 120. The ring 127 surrounds the central opening 124 in the top side 121 of the flow control member 120. The diaphragm 140 selectively creates a seal on the ring 127 to prevent the flow of fluids from the plumbing system into the cavity 123 of the flow control chamber 120, which could then be vented outside of the air admittance valve 100.

The diaphragm 140 includes a circular disc 141 having a top surface 142, a bottom surface 143, and a perimeter. The diaphragm 140 includes a sealing member 144 positioned adjacent to the bottom surface 143 of the circular disc 141. The sealing member 144 extends beyond the perimeter of the circular disc 141 to ensure an adequate seal may be formed with the ring 127 of the flow control member 120. The diaphragm 140 includes a retaining member 145 that connects a portion of the sealing member 144 to the bottom surface 143 of the circular disc 141. If the pressure within the plumbing system exceeds the atmospheric pressure, the pressure within the plumbing system will force the diaphragm 140 against the ring 127 of the flow control member 120 preventing communication between the plumbing system via the interior 113/113A of the base 110 and the cavity 123 of the flow control member 120. If the pressure in the plumbing system is less than the atmospheric pressure, the atmospheric pressure via the ports 116A/116B and the cavity 123 will cause the diaphragm to raise permitting the flow of fluid from the atmosphere to flow into the plumbing system to equalize the pressure.

The diaphragm 140 includes a first arm 146A that extends from the top surface 142 of the circular disc 141. The first arm 146A extends beyond the perimeter of the circular disc 141. The diaphragm 140 includes a second arm 164B that extends from the top surface 142 of the circular disc 141. The second arm 146B may be positioned opposite of the first arm 146A. The second arm 146B extends beyond the perimeter of the circular disc 141. The first and second arms 146A/146B may reduce the likelihood the diaphragm 140 may be damaged if connected to a plumbing system during a pressure test of the plumbing system as discussed herein.

An end of the first arm 146A is positioned adjacent to the top surface of the first standoff 125A. Likewise, the end of the second arm 146B is positioned adjacent to the top surface of the second standoff 125B. The top surfaces of the first and second standoffs 125A/125B are configured to enable the sealing member 144 of the diaphragm 140 to create a seal on the ring 127 of the flow control member 120 while limiting the downward movement of the diaphragm 140. For example, the first and second standoffs 125A/125B may prevent the pressure within the plumbing system from deforming and forcing the diaphragm 140 through the central opening 124 of the flow control member 120.

The end of the first arm 146A is positioned between the first guide 126A and the second guide 126B. The first and second guides 126A/126B may prevent the rotation and or deformation of the diaphragm 140 due to a pressure differential between the plumbing system and the atmospheric pressure. The end of the second arm 146B is positioned between the third guide 126C and the fourth guide 126D. The third and fourth guides 126C/126D may prevent the rotation and or deformation of the diaphragm 140 due to a pressure differential between the plumbing system and the atmospheric pressure. The diaphragm 140 includes a stem 147 that extends away from the retaining member 145 of the diaphragm 145. The stem 147 is configured to be received within a receptacle 128 positioned within the cavity 123 between the top side 121 and the bottom side 121 of the flow control member 120. The stem 147 positioned within the receptacle 128 may also help to prevent damage to the diaphragm 145 when there is a pressure differential between the atmospheric pressure and the pressure within the plumbing system. Alternatively, the receptacle 128 may extend away from the retaining member 145 of the diaphragm 140 and the stem 147 may be positioned within the cavity 123 between the top side 121 and the bottom side 122 of the flow control member 120 as would be appreciated by one of ordinary skill in the art having the benefit of this disclosure.

The top surface 142 of the circular disc 141 includes a recess 148. The cap 130 includes a projection 134 that extends from the interior 132 of the cap 130 towards the diaphragm 140. An end of the projection 134 is positioned in the recess 148 in the top surface 142 of the circular disc 141. The projection 134 and the recess 148 may limit the travel of the diaphragm 140 and thus, may prevent and/or limit damage to the diaphragm 140 due to a pressure differential between the atmospheric pressure and the pressure within the plumbing system. Alternatively, the projection 134 may extend from the top surface 142 of the circular disc 141 and may engage the recess 148 in the interior 132 of the cap 130 as would be appreciated by one of ordinary skill in the art having the benefit of this disclosure.

Figure 6:
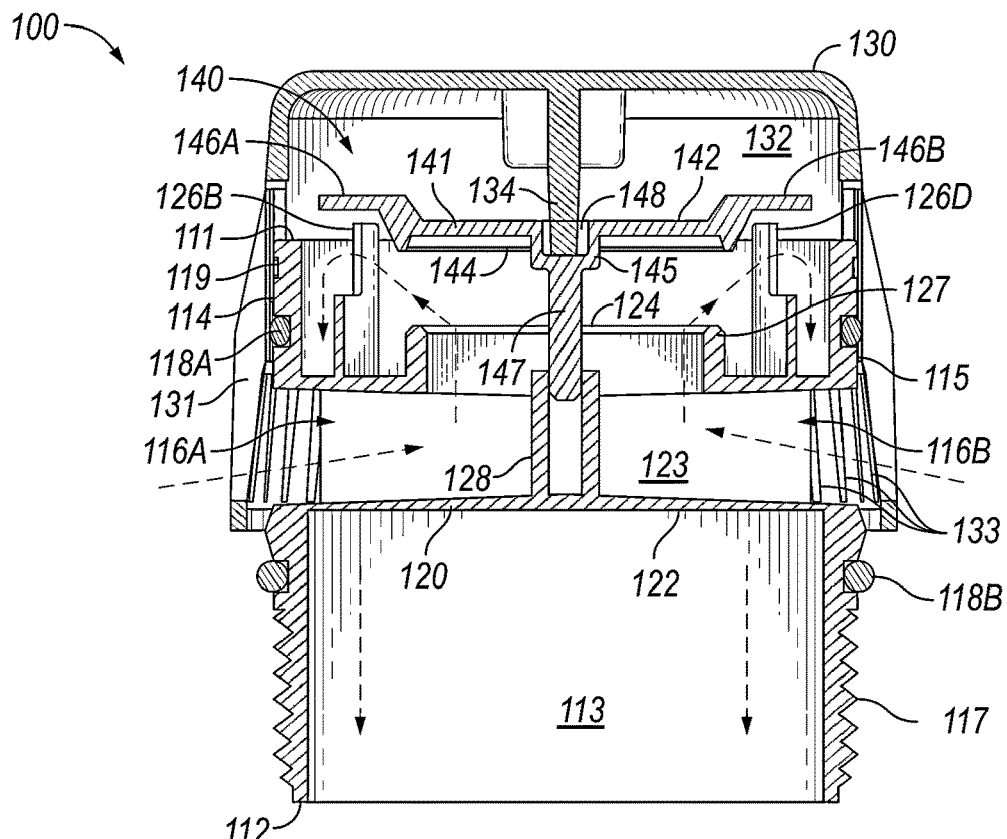
FIG. 6 is a cross-sectional view of an embodiment of an air admittance valve.

FIG. 6 shows a cross-sectional view of an embodiment of an air admittance valve 100. As discussed herein, the air admittance valve 100 may be used to equalize the pressure within a plumbing system. The cap 130 of the air admittance valve 100 is connected to the base 110. The cap 130 is selectively connected to the base 110 with the ridge, or snap ring, 136 of the cap 130 being positioned within groove, or profile, 119 on the exterior 114 of the base 110. The first o-ring 118A on the exterior 114 of the base 110 and being positioned adjacent to the first end 111 of the base 110 engages the second groove 135 in the interior 132 of the cap 130 to create a seal between the cap 130 and the base 110. The seal between the cap 130 and the base 110 seals the interior 113 of the base 110 from outside, or exterior, of the base 110 and cap 130 assembly.

When the pressure with the plumbing system is lower than the external pressure of the air admittance valve 100, pressure from within the cavity 123 of the flow control member 120 is applied to the diaphragm 140. The cavity 123 is exposed to the external pressure via the one or more openings 133 in the exterior 131 of the cap 130 and the first port 116A and the second port 116B in the sidewall 115 of the base 110 as indicated by the arrows shown in FIG. 6. The high external pressure causes the diaphragm 140 to raise lifting the sealing member 144 of the diaphragm 140 of the ring 127 of the flow control member 120. Fluid (i.e., air) may flow into the interior 113 of the base 110 via the 124 central opening of the flow control member 120 as indicated by the arrows shown in FIG. 6. The flow of fluid into the interior 113 of the base 110 enables the equalization of pressure within the plumbing system.

Figure 7:
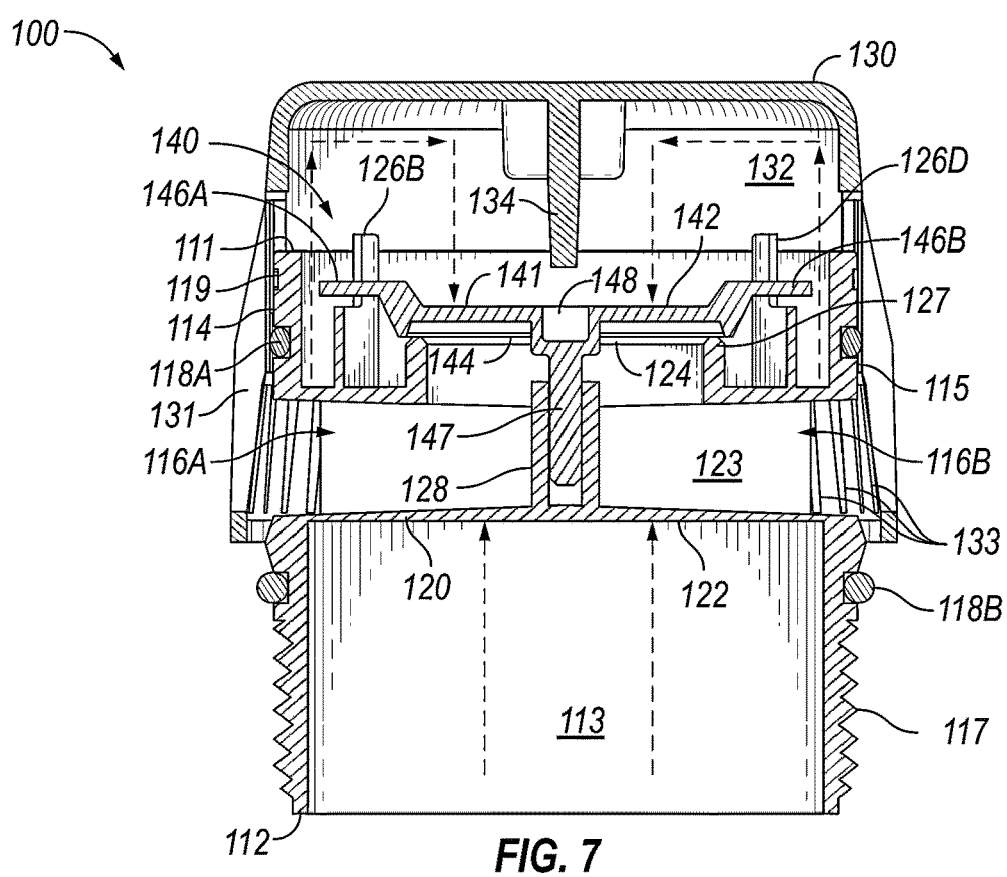
FIG. 7 is a cross-sectional view of an embodiment of an air admittance valve.

FIG. 7 shows a cross-sectional view of an embodiment of an air admittance valve 100. As discussed herein, the air admittance valve 100 may be used to equalize the pressure within a plumbing system. The cap 130 of the air admittance valve 100 is connected to the base 110. The cap 130 is selectively connected to the base 110 with the ridge, or snap ring, 136 of the cap 130 being positioned within groove, or profile, 119 on the exterior 114 of the base 110. The first o-ring 118A on the exterior 114 of the base 110 and being positioned adjacent to the first end 111 of the base 110 engages the second groove 135 in the interior 132 of the cap 130 to create a seal between the cap 130 and the base 110. The seal between the cap 130 and the base 110 seals the interior 113 of the base 110 from outside, or exterior, of the base 110 and cap 130 assembly.

When the pressure with the plumbing system is higher than the external pressure of the air admittance valve 100, pressure from within plumbing system is communicated to the interior 113 of the base 110. Fluid (i.e., which could be air, gas, or liquid) flows up the annulus 113A of the base 110 as indicated by the arrows shown in FIG. 7. The higher pressure with respect to the external atmospheric pressure is applied to the top of the diaphragm 140 cause the sealing member 144 of the diaphragm 140 to remain engaged with the ring 127 of the flow control member 120, which seals off the interior 113 of the base 110 from the external atmospheric pressure.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An apparatus comprising:
   a base, the base having a first end, a second end, an interior, and an exterior, the base having a sidewall, the base is open at the first end and the base is open at the second end, the base having at least a first port in the sidewall;
   a flow control member, the flow control member extends transverse across the interior of the base, the flow control member having a top side, a bottom side, and a cavity between the top side and the bottom side, wherein the cavity is aligned and in communication with the first port, the flow control member having a central opening in the top side, the central opening being in communication with the cavity, wherein the cavity only communicates with the interior of the base through the central opening in the top side of the flow control member;
   a cap, the cap is selectively connected to the first end of the base, the cap having one or more openings in a sidewall, wherein the one or more openings permit fluid to flow from the exterior of the cap into the cavity of the flow control member;
   a first standoff that extends from the top side of the flow control member and a second standoff that extends from the top side of the flow control member;
   a first guide that extends from a top surface of the first standoff, a second guide that extends from the top surface of the first standoff, a third guide that extends from a top surface of the second standoff, and a fourth guide that extends from the top surface of the second standoff;
   a diaphragm, the diaphragm is positioned between the top side of the flow control member and the cap, the diaphragm selectively seals the central opening in the top side of the flow control member; and
   wherein the diaphragm prevents a flow of fluid from the interior of the base into the cavity of the flow control member and permits a flow of fluid from the cavity of the flow control member into the interior of the base.

2. The apparatus of claim 1, further comprising a second port in the sidewall.

3. The apparatus of claim 2, wherein the second port is opposite the first port.

4. The apparatus of claim 3, wherein the sidewall of the base is cylindrical.

5. The apparatus of claim 1, further comprising a ring that extends from the top side of the flow control member, the ring surrounds the central opening in the top side of the flow control member, wherein the diaphragm selectively creates a seal on the ring.

6. The apparatus of claim 5, wherein the diaphragm comprises:
   a circular disc having a top surface, a bottom surface, and a perimeter;
   a sealing member positioned adjacent to the bottom surface of the circular disc, wherein the sealing member extends beyond the perimeter of the circular disc;
   a retaining member, the retaining member connects a portion of the sealing member to the bottom surface of the circular disc;
   a first arm that extends from the top surface of the circular disc, wherein the first arm extends beyond the perimeter of the circular disc; and a second arm that extends from the top surface of the circular disc, wherein the second arm is positioned opposite of the first arm and wherein the second arm extends beyond the perimeter of the circular disc.

7. The apparatus of claim 6, wherein an end of the first arm is positioned adjacent to the top surface of the first standoff and is positioned between the first guide and the second guide and wherein an end of the second arm is positioned adjacent to the top surface of the second standoff and is positioned between the third guide and the fourth guide.

8. The apparatus of claim 7, a receptacle that extends away from the retaining member of the diaphragm and a stem positioned within the cavity between the top side and the bottom side of the flow control member, wherein the stem is positioned within the receptacle.

9. The apparatus of claim 7, further comprising a stem that extends away from the retaining member of the diaphragm and a receptacle positioned within the cavity between the top side and the bottom side of the flow control member, wherein the stem is positioned within the receptacle.

10. The apparatus of claim 9, further comprising a projection that extends from the top surface of the circular disc and a recess in the interior of the cap, wherein an end of the projection is positioned in the recess in the interior of the cap.

11. The apparatus of claim 9, further comprising a recess in the top surface of the circular disc and a projection that extends from an interior of the cap towards the diaphragm, wherein an end of the projection is positioned in the recess in the top surface of the circular disc.

12. The apparatus of claim 11, further comprising a first O-ring positioned on the exterior of the base, the first O-ring positioned between the first end of the base and the first port, wherein the first O-ring creates a seal between the base and the cap.

13. The apparatus of claim 12, further comprising a first groove in the exterior of the base, wherein the first groove is positioned between the first end of the base and the first o-ring.

14. The apparatus of claim 13, further comprising a second groove in the interior of the cap, wherein the second groove is configured to receive the first o-ring positioned on the interior of the base.

15. The apparatus of claim 14, further comprising a ridge on the interior of the cap, wherein the first groove in the exterior of the base is configured to receive the ridge on the interior of the cap.

16. The apparatus of claim 15, further comprising threads on the exterior of the base, wherein the threads are located adjacent to the second end of the base.

17. The apparatus of claim 16, further comprising a second O-ring on the exterior of the base.

18. The apparatus of claim 17, wherein the second O-ring is positioned between the threads and the first port.

* * * * *